United States Patent
Testa et al.

(10) Patent No.: US 6,279,419 B1
(45) Date of Patent: Aug. 28, 2001

(54) STEERING WHEEL

(75) Inventors: Giuseppe Testa, Illasi; Adolfo Ridolfi; Paolo Vian, both of Tregnago, all of (IT)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/481,181

(22) Filed: Jan. 12, 2000

(30) Foreign Application Priority Data

Feb. 19, 1999 (EP) .................................................. 99830090

(51) Int. Cl.⁷ ........................................................ B62D 1/06
(52) U.S. Cl. .................................................. 74/558; 74/552
(58) Field of Search .......................... 74/552, 558, 558.5

(56) References Cited

U.S. PATENT DOCUMENTS 4,683,018   7/1987   Sutcliffe et al. ..................... 156/196

FOREIGN PATENT DOCUMENTS

| 29813895 | 11/1998 | (DE) . | |
|---|---|---|---|
| 791052 | 2/1958 | (GB) | 74/552 |
| 980673 | 1/1965 | (GB) | 74/552 |
| 0120567 | 7/1984 | (JP) | 74/552 |
| 0050069 | 3/1985 | (JP) | 74/552 |
| 0219159 | 11/1985 | (JP) | 74/552 |
| 0013861 | 1/1988 | (JP) | 74/552 |

*Primary Examiner*—Mary Ann Green
(74) *Attorney, Agent, or Firm*—Lonnie Drayer

(57) ABSTRACT

A method of manufacturing a motor car steering wheel with an external shell made of carbon fibers, which comprises preparing a pile of sheet materials, hot molding thereof for obtaining respective half-shells with a shape corresponding to that of respective halves of the steering wheel being manufactured, mechanical flattening of the front surfaces of the two half-shells, mounting of the two half-shells above and under a steering wheel body formed by a metallic core covered by resin. The steering wheel body has lateral profiles which act as fixing supports for the two half-shells.

8 Claims, 4 Drawing Sheets

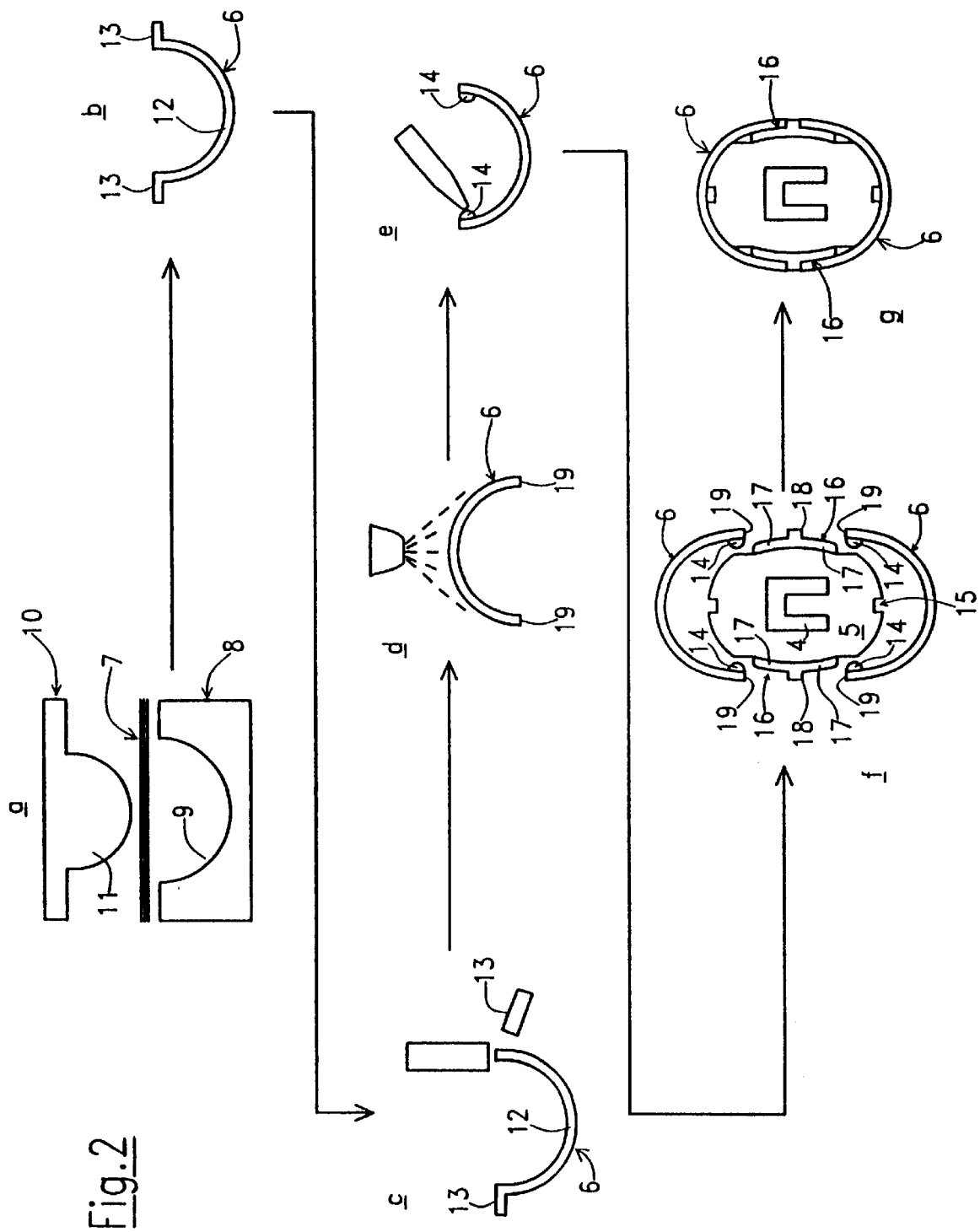

STEERING WHEEL

BACKGROUND OF THE INVENTION

The present invention relates to a steering wheel with an external shell made of carbon fibers and the method of manufacturing the same.

Steering wheels for automobiles are presently made of an internal metallic core covered by resin and of an external coating and finishing shell, made of various materials, which represents the appearing part of the steering wheel.

Among the several known processes for manufacturing motor car steering wheels is the process comprising providing for formation of two half-shells by hot pressing of one or more material sheet inside molds of suitable shape, subsequent mechanical flattening working of the junction line of the two half-shells, application of the half-shells on a steering wheel body formed by a metallic core covered by resin and mutual fixing of the two half-shells along said junction line.

Fixing of the two half-shells represents a particularly delicate step of the manufacturing process, especially in case of half-shells of small thickness as those made of carbon fibers.

An object of the present invention is to provide a process of the above said type, which is particularly suitable for manufacturing steering wheels with a shell of carbon fibers.

According to the invention this object is obtained by a process comprising preparation of piles of sheet materials, hot molding thereof for obtaining respective half-shells with a shape corresponding to that of respective halves of the steering wheel being manufactured, mechanical flattening of the front surfaces of the two half-shells, mounting of the two half-shells above and under a steering wheel body formed by a metallic core covered by resin, characterized in that said steering wheel body is previously provided with lateral profiles adapted for acting as fixing supports for the two half-shells.

Fixing of the half-shells is preferably obtained by gluing of the internal surface of the half-shells on the external surface of the lateral profiles, suitably complementarily shaped.

It has been possible to verify that in this way a very strong structural assembling is obtained which is able to resist all the aging and safety test required by the automobile manufacturers.

BRIEF DESCRIPTION OF THE INVENTION

The features of the present invention will be made more evident by the following detailed description of an embodiment there of which is illustrated by non-limiting way in the accompanying drawings, in which:

FIG. 1 shows, partly in view and partly in section, a typical steering wheel;

FIG. 2 schematically shows several steps of the manufacturing process according to the present invention;

DETAILED DESCRIPTION OF THE INVENTION

Figure 1:
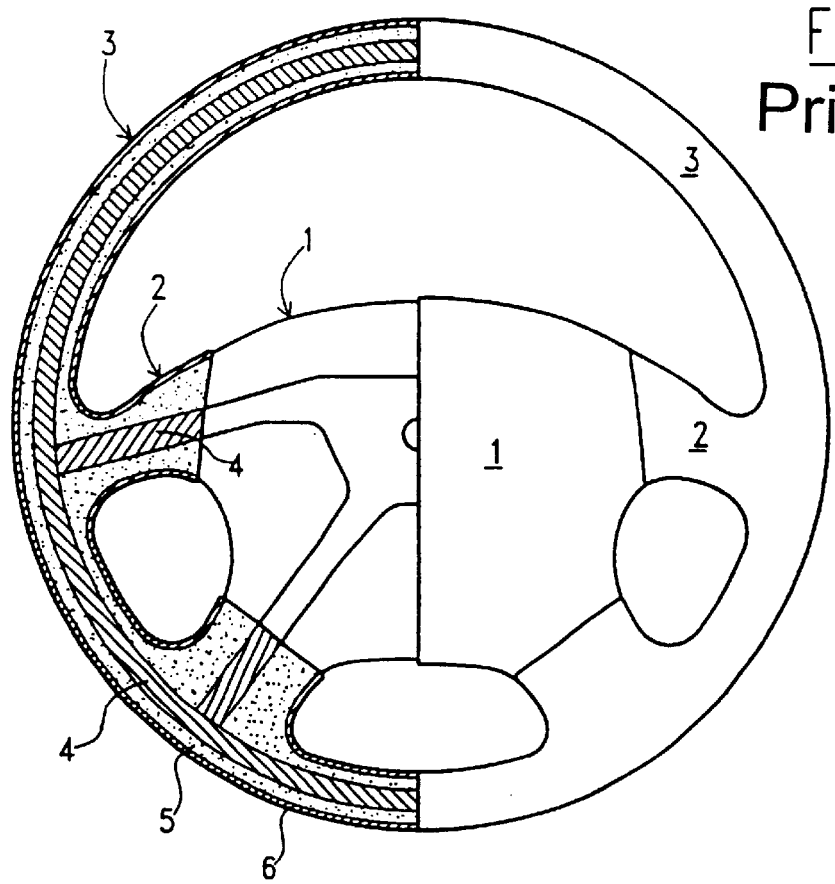

As shown in FIG. 1, a typical steering wheel for an automobile is composed by a central part or hub part 1, a plurality of radial spokes 2 and an external rim 3.

According to the present technology the external rim 3 and the spokes 2 consist of an internal metallic core 4 covered by resin 5 and an external coating and finishing shell, in its turn formed by two half-shells 6 superimposed to each other and joined together.

The two half-shells 6 are manufactured by using the technology schematically illustrated in FIG. 2, steps a)–d).

More precisely, the forming step provides for hot molding of a pile of sheet materials, globally designated with 7 in FIG. 2, step a), inside a metal mold 8 with a cavity 9 of suitable shape, on which a cover 10 with a protrusion 10 of complementary shape with respect to the cavity 9 is superimposed.

The pile 7 may be composed by sheets of various thickness so as to provide a total thickness of the half-shell which is comprised between 1.0 and 2.0 mm.

The single sheets are made of carbon fibers combined with glass fibers or aramidic fibers or a combination of said fibers.

The above mentioned fibers are impregnated with specific resins which at the end of the cycle are able to grant structural rigidity to the half-shell assembly. The resins used for impregnating the fibers can be of various natures, for example epoxy, polyester, and polyurethane. The impregnation of the fibers may be carried out both before the use, by means of specific machines which dip the fabric into the resin according a specific process, and during the half-shell molding step, by smearing, injection or other dispensing systems which allow impregnation of the fibers inside the mold.

The molding time depends on the temperature being used and is comprised between 1 and 3.5 minutes. The mold temperature, for an optimal process, is comprised between 70° C. and 150° C. The molding pressure required for a correct catalysis of the resins is 0.7 bar.

Figure 3:
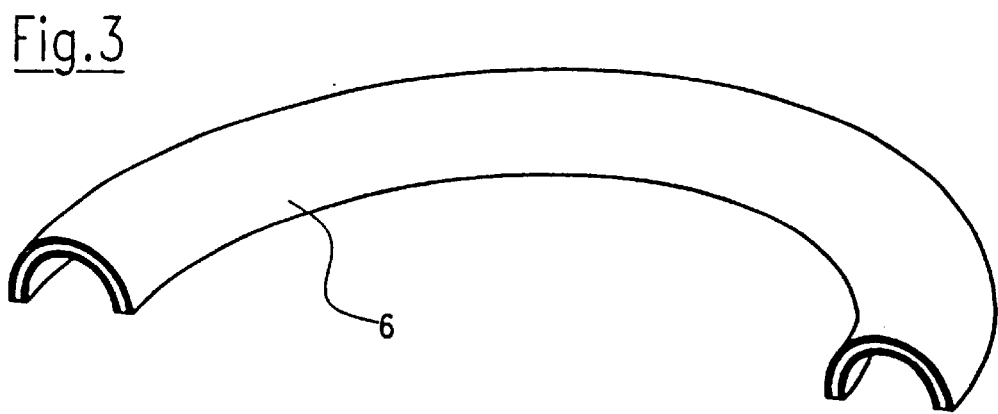
FIG. 3 shows a partial perspective representation of a half-shell after the hot molding step and the subsequent flattening step and before the provision of the coupling teeth.

The half-shell obtained at the end of the molding operation is illustrated in FIG. 2, step b), and comprises a curved central part 12 and two lateral fins 13. The latter are then removed by mechanical flattening working, step c) of FIG. 2. The half-shell is then as shown in FIG. 3.

Two half-shells obtained in this way are then subjected to a painting, step d) of FIG. 2, and provided with glue 14 on their internal surface, step e) of FIG. 2. It is possible to use glues of several kinds, which have structural functions, belonging to epoxy, polyurethane and methacrylate families.

Figure 5:
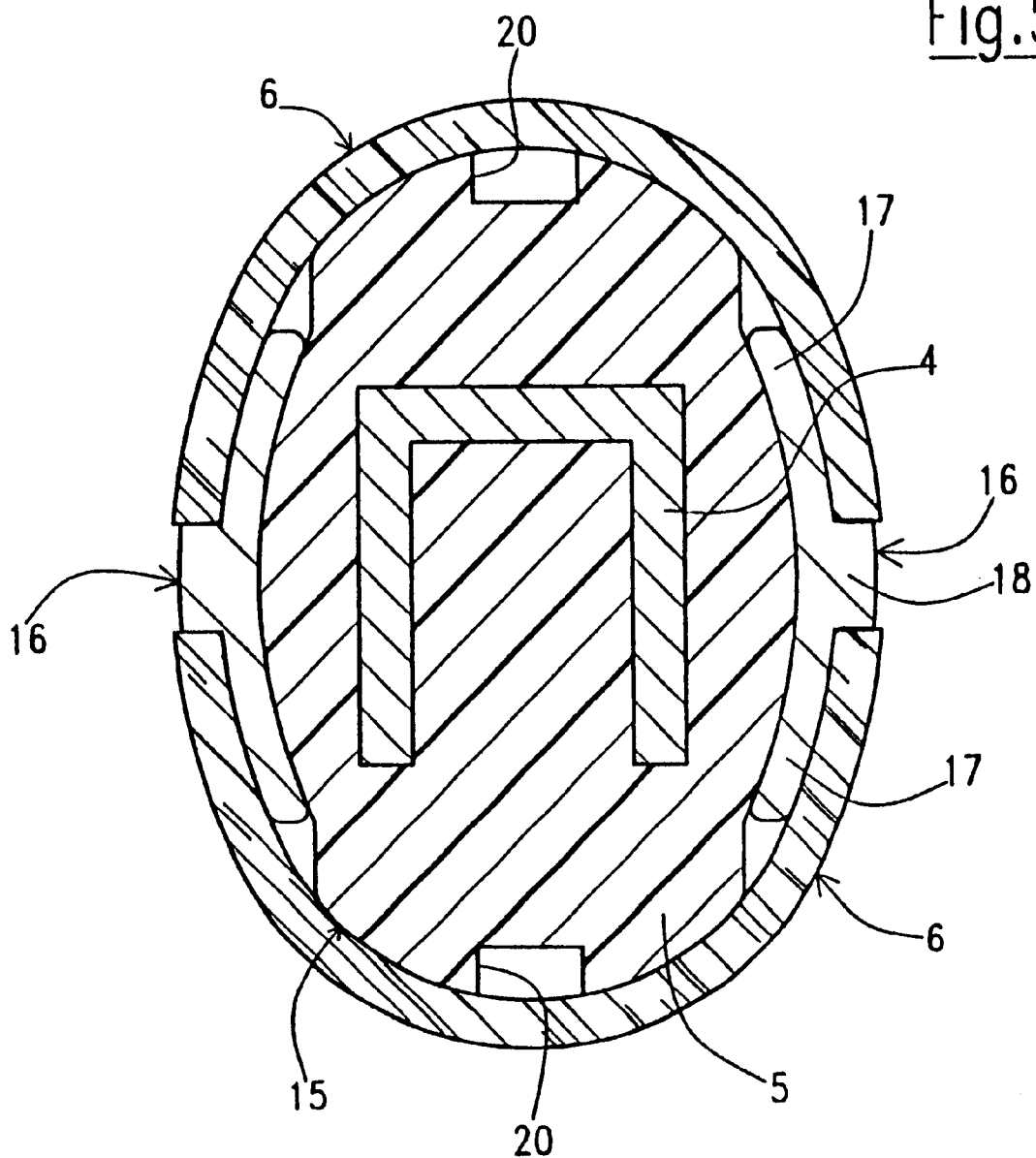
FIG. 5 shows the same steering wheel in cross-section, in assembled condition.

Meanwhile, a steering wheel body 15 (formed by the metallic core 4 and the resin covering 5 as previously said with reference to FIG. 1) has separately been prepared, to which two symmetrical profiles 16 are applied, for example by clawing, each of which is formed by two lateral flanges 17 with internal surface complementary to the external surface of the steering wheel body 15 and external surface complementary to the internal surface of the two half-shells and by an intermediate rib 18 adapted for operating as abutment shoulder for the front surfaces 19 of the two half-shells. The profiles 16, lateral flanges, and the ribs 18 may be made of metal, such as aluminum, steel, titanium, magnesium, etc., or may be a synthetic material such as thermoplastics (ADS, PA, PP, etc.). The rib 18 may be exposed as shown in FIG. 5, being visible after assembling the shells over the steering wheel grip, or may be hidden after assembly. The external surfaces of the flanges 17 are smeared with suitable glue, of course of the same type as the glue 14.

The two half-shells 6 are put one above and the other under the steering wheel body 15 with the profiles 16, step f) of FIG. 2, and fixed by gluing because of the glue previously applied to the same half-shells and to the profiles 16.

The assembly obtained in this way, step g) of FIG. 2, may leave a portion of the profiles 16 at sight or hidden them completely.

The painting operation may be carried out after the final assembling rather than on the single half-shells.

It is to be noted that the steering wheel body 18 is preferably provided with two diametrically opposite grooves 19 which serve for compensating the thermal expansions of the resin 5.

Figure 4:
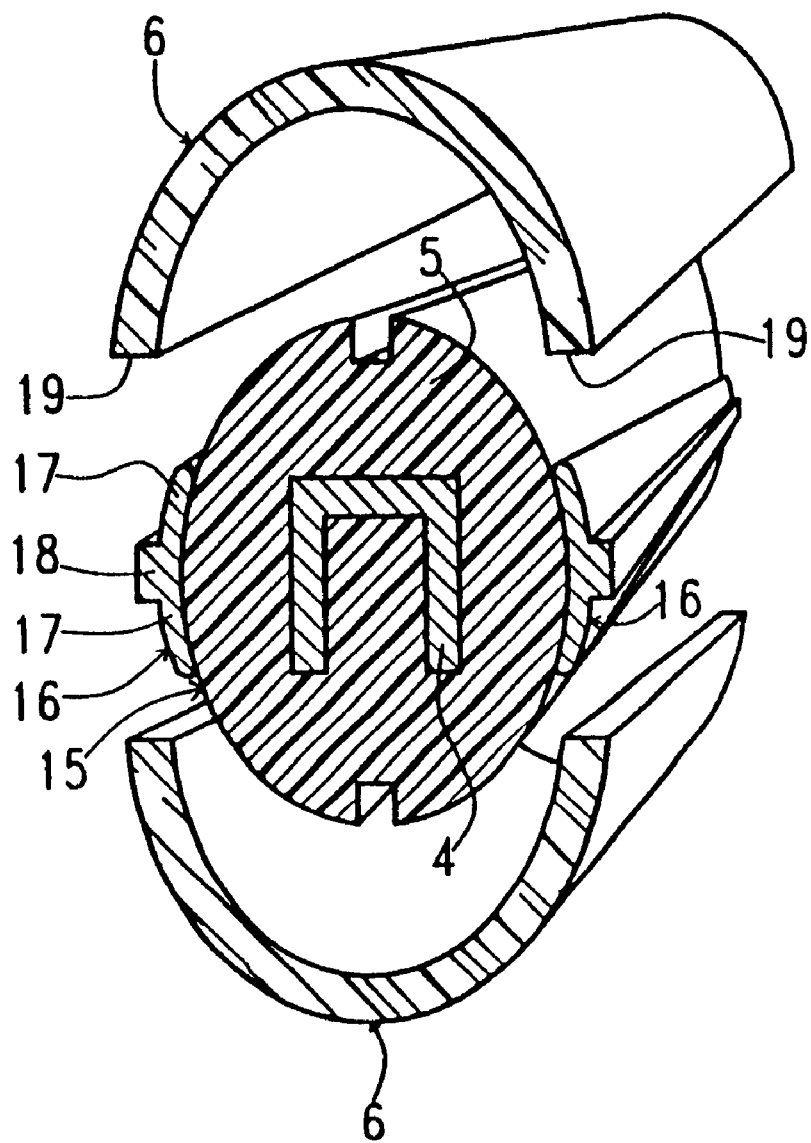
FIG. 4 shows in perspective view, just before the final assembling of the two half-shells, a portion of a steering wheel manufactured by the process according to the invention.

The assembly of the two half-shells 6 and the steering wheel body 15 with the profiles 16 is shown in perspective view, just before the final assembling, in FIG. 4.

The same assembly is shown in cross-section, with assembling being ended, in FIG. 5.

It is to be understood that while the preferred embodiment of the present invention has been described, various changes and modifications may be made by those skilled in the art without departing from the scope of the invention as set forth in the claims.

We claim:

1. A steering wheel comprising:

a steering wheel body formed by a metallic core covered by resin, said steering wheel body having lateral profile members; and two half-shells mounted above and under said steering wheel, wherein said lateral profile members support the two half-shells, said lateral profile members comprise two lateral flanges arranged at a side of the steering wheel body and an intermediate rib.

2. A steering wheel according to claim 1, wherein internal surfaces of the half-shells are glued to external surfaces of the lateral profile members.

3. A steering wheel according to claim 1, wherein internal surfaces of the half-shells are glued to the intermediate ribs of the lateral profile members.

4. A steering wheel according to claim 1, wherein said half-shells comprise a pile of sheet materials.

5. A steering wheel according to claim 4, wherein said sheet materials comprise carbon fibers and glass fibers.

6. A steering wheel according to claim 4, wherein said sheet materials comprise carbon fibers and aramidic fibers.

7. A steering wheel according to claim 4, wherein said sheet materials comprise carbon fibers, glass fibers, and aramidic fibers.

8. A steering wheel according to claim 7, wherein said carbon fibers are impregnated by resin, glass fibers are impregnated by resin, and aramidic fibers are impregnated by resin.

* * * * *